US010390373B2

(12) United States Patent
Li

(10) Patent No.: US 10,390,373 B2
(45) Date of Patent: Aug. 20, 2019

(54) METHOD, APPARATUS AND SYSTEM FOR ESTABLISHING CONNECTION BETWEEN DEVICES

(71) Applicant: AITECH, LLC, Buffalo Grove, IL (US)

(72) Inventor: Dongge Li, Hubei (CN)

(73) Assignee: Hangzhou Zhileng Technology Co. Ltd., Hangzhou, Zhejiang (CN)

( * ) Notice: Subject to any disclaimer, the term of this patent is extended or adjusted under 35 U.S.C. 154(b) by 584 days.

(21) Appl. No.: 14/889,312

(22) PCT Filed: May 5, 2014

(86) PCT No.: PCT/CN2014/076804
§ 371 (c)(1),
(2) Date: Feb. 24, 2016

(87) PCT Pub. No.: WO2014/180294
PCT Pub. Date: Nov. 13, 2014

(65) Prior Publication Data
US 2016/0165643 A1 Jun. 9, 2016

(30) Foreign Application Priority Data
Jul. 5, 2013 (CN) .......................... 2013 1 0165388

(51) Int. Cl.
*G06F 3/01* (2006.01)
*H04W 76/10* (2018.01)
(Continued)

(52) U.S. Cl.
CPC ............ *H04W 76/10* (2018.02); *G06F 3/017* (2013.01); *G06F 3/0346* (2013.01); *H04W 64/006* (2013.01); *H04W 76/14* (2018.02)

(58) Field of Classification Search
None
See application file for complete search history.

(56) References Cited

U.S. PATENT DOCUMENTS 9,734,318 B2 * 8/2017 Kim ...................... G06F 1/1694
2008/0244752 A1 * 10/2008 Gudan ................ G06F 21/6218 726/27
(Continued)

FOREIGN PATENT DOCUMENTS

CN 101299812 A 11/2008
CN 102143483 A 8/2011
(Continued)

OTHER PUBLICATIONS

Chinese Patent Office, International Search Report and Written Opinion of International Searching Authority for PCT/CN2014/076800 dated May 15, 2014 (10 pages).
(Continued)

*Primary Examiner* — Matthew C Bella
*Assistant Examiner* — Brian D Shin
(74) *Attorney, Agent, or Firm* — Greensfelder, Hemker & Gale, P.C.

(57) ABSTRACT

A method for establishing a connection between a detection device and another device, wherein the detection device is coupled with a remote-sensing motion detection apparatus, the method including acquiring a first motion signature information of a motion object through the remote-sensing motion detection apparatus; and establishing a connection with the other device when the first motion signature information matches with a second motion signature information of the motion object acquired by the other device.

20 Claims, 3 Drawing Sheets

(51) Int. Cl.

| | |
|---|---|
| ***H04W 76/14*** | (2018.01) |
| ***H04W 64/00*** | (2009.01) |
| ***G06F 3/0346*** | (2013.01) |

(56) References Cited

U.S. PATENT DOCUMENTS

2012/0050153 A1* 3/2012 Dvortsov .............. H04W 12/04 345/156
2014/0176436 A1* 6/2014 Raffa ...................... G06F 3/017 345/158

FOREIGN PATENT DOCUMENTS

| | | | | |
|---|---|---|---|---|
| CN | 102292979 | A | 12/2011 | |
| CN | 102307309 | A | 1/2012 | |
| CN | 102333313 | A | 1/2012 | |
| CN | 102693084 | A | 9/2012 | |
| CN | 102710877 | A | 10/2012 | |
| CN | 102881137 | A | 1/2013 | |
| CN | 102955750 | A | 3/2013 | |
| EP | 2395446 | A1 * | 12/2011 | ............. G06F 21/34 |
| WO | 2012113272 | A1 | 8/2012 | |
| WO | 2014180291 | A1 | 11/2014 | |
| WO | 2014180293 | A1 | 11/2014 | |
| WO | 2014180294 | A1 | 11/2014 | |

OTHER PUBLICATIONS

Chinese Patent Office, International Search Report and Written Opinion of International Searching Authority for PCT/CN2014/076803 dated Aug. 13, 2014 (11 pages).

Chinese Patent Office, International Search Report and Written Opinion of International Searching Authority for PCT/CN2014/076804 dated Aug. 7, 2014 (16 pages).

* cited by examiner

METHOD, APPARATUS AND SYSTEM FOR ESTABLISHING CONNECTION BETWEEN DEVICES

CROSS REFERENCE TO RELATED APPLICATION

This application is a U.S. National Stage Entry under 35 USC § 371 of PCT/CN2014/076804 filed on May 5, 2014, which claims priority from Chinese Application No. 201310165388.6 filed on May 7, 2013, both of which are incorporated herein by reference and made a part hereof.

TECHNICAL FIELD

The invention relates to the field of wireless information technology, especially a technology that establishes connection between devices.

BACKGROUND

In the prior art, the connection between devices mostly via Bluetooth, Infrared or WiFi etc., wherein, Bluetooth and Infrared require a close distance between devices, Bluetooth also needs a user to manually input a connection key, Infrared can only transmit small amounts of data, while WiFi requires the connection devices be in the same local area network. All the methods greatly limit the connection between devices and communication availability, thus reduce user experience.

SUMMARY

The present invention aims to provide a method, apparatus and system for establishing connection between devices.

According to an aspect of the present invention, there is provided a method for establishing connection between detection device and other device, wherein, the detection device coupled with a remote-sensing motion detection apparatus, wherein, the method shall comprise the following steps, A. acquire the first motion signature information of a motion object through the remote-sensing motion detection apparatus, B. when the first motion signature information matches with second motion signature information of the motion object acquired by the other device, the detection device establishes a connection with the other device.

According to another aspect of the present invention, there is provided an apparatus for connecting detection device with other device, wherein, the detection device is coupled with a remote-sensing motion detection apparatus, wherein, the apparatus shall comprise, The motion detection apparatus, acquisition of the first motion signature information of a motion object through the remote-sensing motion detection apparatus, The connection establishment apparatus, when the first motion signature information matches with second motion signature information of the motion object acquired by the other device, the detection device establishes a connection with the other device.

According to one more aspect of the present invention, there is provided a system for connecting devices, wherein, the system comprises the detection device coupled with a remote-sensing motion detection apparatus and the other device that is to be connected with the detection device, wherein, the detection device shall, acquire the first motion signature information of a motion object through the remote-sensing motion detection apparatus, when the first motion signature information matches with second motion signature information of the motion object acquired by the other device, the detection device establishes a connection with the other device.

Wherein, the other device shall, detect the motion of the motion object to acquire the second motion signature information of the motion object, when the second motion signature information matches with the first motion signature information of the motion object acquired by the detection device, the other device establishes a connection with the detection device.

Compared with the prior art, in the present invention by matching the motion signature information of the motion object acquired respectively by the detection device and the other device, a connection can be established between the detection device and the other device when the two information matches with each other. Therefore there is no need for a user to manually input a connection key when the connection between the devices being established, and the security and the convenience of the connection are improved and a better user experience is achieved.

BRIEF DESCRIPTION OF THE FIGURES

Other objects, signatures, and advantages of the present invention will become apparent upon consideration of the following detailed description of non-limiting embodiments and the accompanying drawings.

The same or similar symbols in the drawings indicate the same or similar units.

DETAILED DESCRIPTION OF THE PREFERRED EMBODIMENT

Figure 1A:
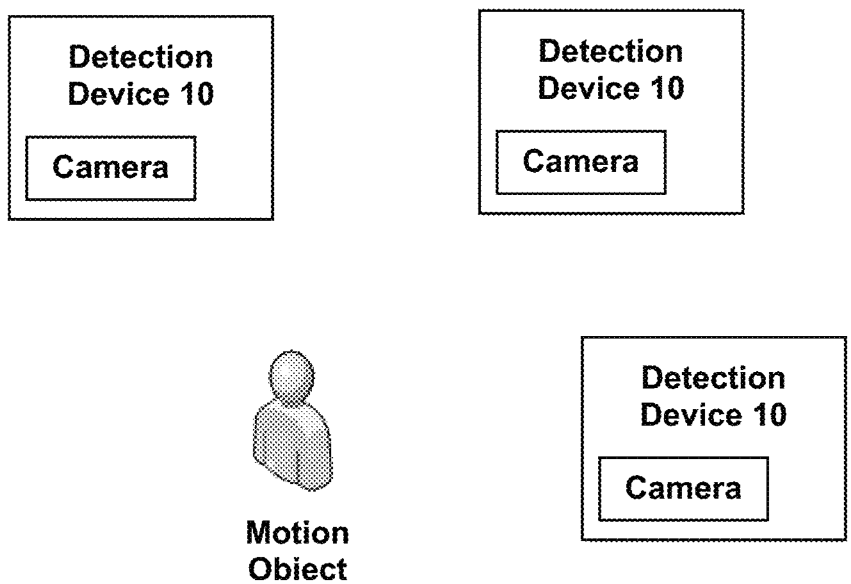
FIGS. 1*a* and 1*b* illustrate an application diagram according to the present invention.

With drawings show the following instructions to further elaborate the details of this invention.

According to the present invention, the detection device can connect with other device on the basis of the motion detection of the motion object, then interact with the connected other device.

Wherein, the detection device coupled with a remote-sensing motion detection apparatus that detects the first motion signature information and sends the detected first motion signature information to the detection device. In this case, the remote-sensing motion detection apparatus including but not limited to any non-contact motion detection device that applicable in the present invention, more specifically, it includes a variety of sensing devices that non-contact detect the motion of a object within a certain range or within a certain distance, such as two-dimensional camera, three-dimensional camera, ultrasonic sensor, radio wave sensor, infrared motion sensor, pyroelectric infrared detector etc. For example, the camera captures the motion image of a motion object and acquires the first motion signature information of the motion object through the motion image analysis, such as the motion trajectory, motion direction and motion velocity etc. of the motion object. Furthermore, the remote-sensing motion detection apparatus can detect or passively, wherein, actively detection comprises acquiring the motion signature information of the motion object through send specific wave and detect its reflection, passive detection comprises detecting the signal from the motion object and acquiring the corresponding motion signature information.

The detection device including but not limited to any electronic devices that applicable in the present invention, coupled with a remote-sensing motion detection apparatus and has computing capability, such as TV, computer, server, workstation, mobile device etc., the workstation includes a variety of self-service terminal like commercial vending equipment, commercial checkout equipment, mobile device like mobile phone, tablet computer, PPC, PDA and PSP etc. portable equipments with communication function.

Here, the coupling of the detection device with the remote-sensing motion detection apparatus including but are not limited to any connections applicable for the information transmitting between them, such as wired connection, wireless connection or a combination of both, specifically, such as the remote-sensing motion detection apparatus is built in the detection device, or the remote-sensing motion detection apparatus is externally arranged at the detection device, the two communicate wirelessly. Further, the coupling is not limited to direct connection, the detection device and the remote-sensing motion detection apparatus can also communicate by other apparatus, device or system, such as the existing communication network, which including but not limited to 2G/3G/LTE wireless communication network, DSL/ADSL wire communication network and Internet etc. networks can provide communication services between devices.

In addition, devices can connect with the detection device including but not limited to other detection device coupled to remote-sensing motion detection apparatus and other device can detect its own motion by the MEMS (Micro Electro Mechanical systems) motion sensing device or camera of the apparatus, the latter including but not limited to a variety of mobile devices, such as mobile phone, tablet computer, PPC, PDA and PSP etc. portable equipments with communication function. In this paper, for ease of presentation, illustrates the latter device by taking the apparatus connected with MEMS motion sensing device as an example, and referred to as "MEMS devices".

For example, as shown in FIG. 1*a*, more detection device 10 detect the motion signature of the motion object, and acquire the motion signature information of the motion object by mutually matching, the connection between more detection device 10 can be established. In this case, the motion object including but not limited to any objects applicable in the present invention, which motion can be detected by remote-sensing motion detection apparatus, such as people, moving objects and so on.

Figure 1B:
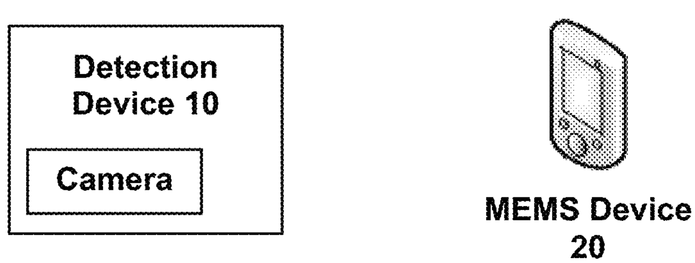

For another example, as shown in FIG. 1*b*, the detection device 10 acquires the first motion signature information of the MEMS device 20 according to the detection of the remote-sensing motion detection apparatus, the MEMS device 20 detects its self-motion through the MEMS motion sensor and acquires the corresponding second motion signature information, during the matching of the first motion signature information and the second motion signature information, the connection between the detection device 10 and the MEMS device 20 is established, that is, here, the MEMS device 20 is both the motion object to be detected and the other device to be established connection with the detection device 10.

It should be noted that the present invention has no limitation on the number of devices to establish connection. Thus, although the present invention takes mostly the connection establishment of one detection device 10 and one other device (e.g., another detection device 10 or MEMS device 20) as example to illustrate, however, it is understood by those skilled in the art that the present invention also applicable to the connection establishment of one detection device 10 and more other devices and the connection establishment of more detection device 10 and more other devices.

For example, one detection device 10 detects the motion of more MEMS device 20 and thereby acquires each first motion signature information, when one first motion signature information matches with the second motion signature information of the MEMS device 20 acquired by its motion detection, the detection device 10 establishes connection with the corresponding MEMS device 20, so that the detection device 10 can establish connection with more MEMS device 20.

Figure 2A:
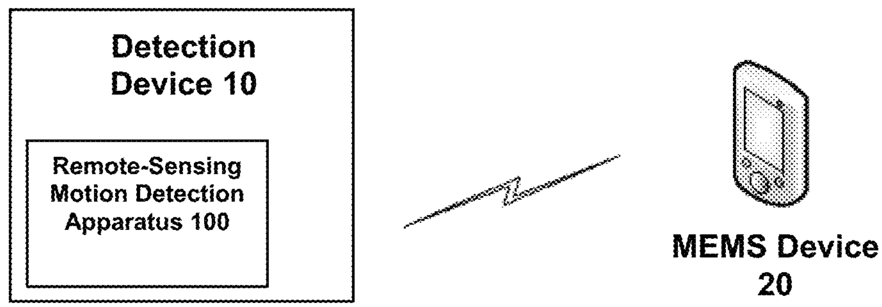
FIGS. 2*a* and 2*b* illustrate a system diagram according to the present invention.

FIG. 2*a* illustrates a system diagram according to an embodiment of the present invention. As shown in FIG. 2*a*, the system 1 comprises the detection device 10 and the MEMS device 20. Wherein, for example, the detection device 10 acquires the first motion signature information of the MEMS device 20 through its remote-sensing motion detection apparatus 100, the MEMS device 20 acquires the second motion signature information of its own motion through its MEMS motion sensor, when the first motion signature information matches with the second motion signature information, the detection device 10 establishes connection with the MEMS device 20. Here, the matching can be performed either in the detection device 10 or the MEMS device 20. Further, the detection device 10 and the MEMS device 20 may also encode the first motion signature information and the second motion signature information on the basis of the predetermined encoding method, then establish connection according to the matching of the encoded first motion signature information and the encoded second motion signature information.

Figure 2B:
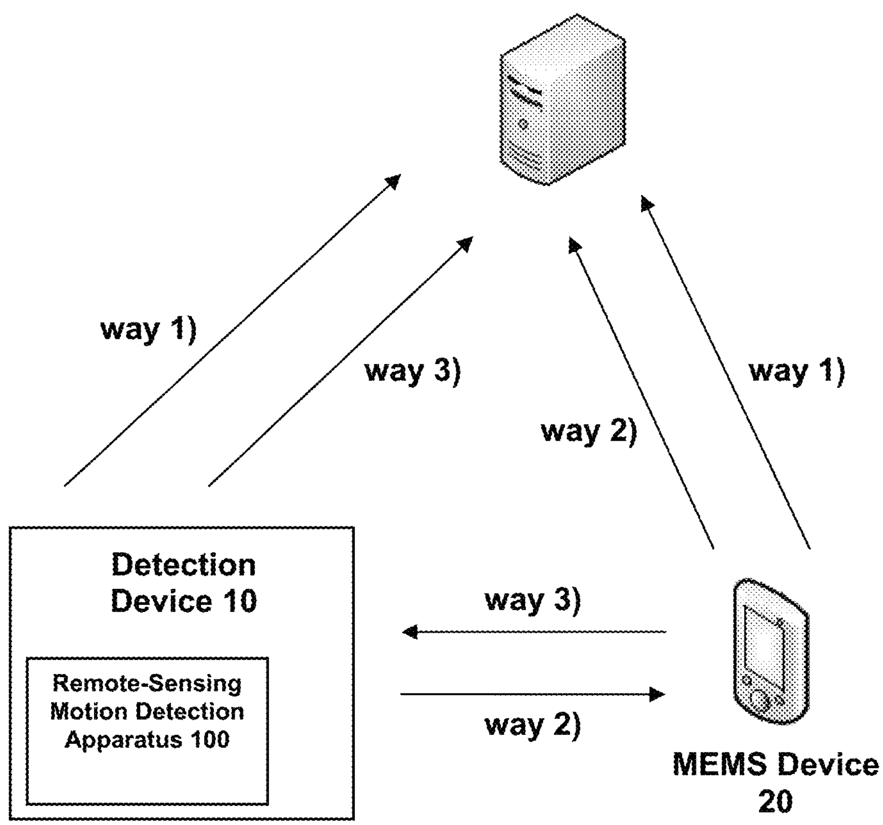

FIG. 2*b* illustrates a system diagram according to another embodiment of the present invention. As shown in FIG. 2*b*, the system 2 comprises the detection device 10, the MEMS device 20 and the intermediate server 30. Wherein, for example, the detection device 10 acquires the first motion signature information of the MEMS device 20 through its remote-sensing motion detection apparatus 100, the MEMS device 20 acquires the second motion signature information of its own motion through its MEMS motion sensor, the intermediate server 30 matches the first motion signature information and the second motion signature information, when the two match, the detection device 10 establishes connection with the MEMS device 20.

Here, the ways that the intermediate server 30 acquires the first motion signature information and the second motion signature information including at least the following three, 1) the detection device 10 and the MEMS device 20 send the first motion signature information and the second motion signature information to the intermediate server 30 respectively, the intermediate server 30 matches the two and sends the matching results back to the detection device 10 and the MEMS device 20 respectively, when the two match, the detection device 10 establishes connection with the MEMS device 20, 2) the detection device 10 sends its acquired first motion signature information to the MEMS device 20, the MEMS device 20 sends the first motion signature information and the second motion signature information to the intermediate server 30, then the intermediate server 30 matches the two and sends the matching results back to the MEMS device 20, when the two match, the MEMS device 20 establishes connection with the detection device 10, 3) the MEMS device 20 sends its acquired second motion signature information to the detection device 10, the detection device 10 sends the first motion signature information and the second motion signature information to the intermediate server 30, then the intermediate server 30 matches the two and sends the matching results back to the detection device 10, when the two match, the detection device 10 establishes connection with the MEMS device 20.

The above three ways are applicable to different conditions and can meet specific application needs. For example, way 1) can be applied to the condition that both the detection device 10 and the MEMS device 20 can communicate with the intermediate server 30, and further, when the first motion signature information and the second motion signature information match, the connection between the MEMS device 20 and the detection device 10 can be established via the intermediate server 30. Way 2) and 3) may be respectively applied to the condition that only the detection device 10 or only the MEMS device 20 may communicate with the intermediate server 30, thereby the detection device 10 or the MEMS device 20 sends the first motion signature information and the second motion signature information to the intermediate server 30 for matching.

Here, the intermediate server 30 including but are not limited to computer, network host, single network server or multiple network server or cloud consisting of multiple servers. In this case, the cloud consisting of cloud computing based a large number of computers or a network servers, wherein, cloud computing is a distributed computing, a group of loosely coupled computers make up a super virtual computer. Further, in the above three ways, the correspondent nodes can communicate with the intermediate server are not the same, so the intermediate servers in these three ways may be different, or when an intermediate server is a combination of multiple devices, for these three ways provide matching by different devices. Further, since in way 1), the intermediate server can provide matching and connection, these two functions can also be provided by different devices in "intermediate server combination".

Figure 3:
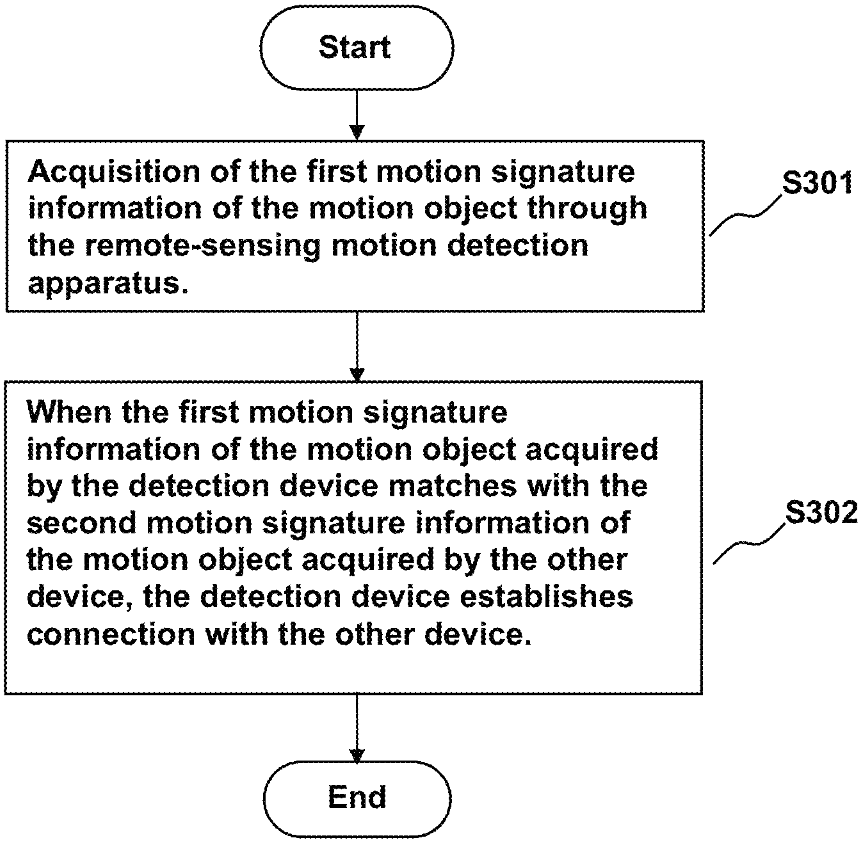
FIG. 3 illustrates a method flow chart according to a preferred embodiment of the present invention.

FIG. 3 illustrates a method flow chart according to an embodiment of the present invention.

In step S301, the detection device acquires the first motion signature information of the motion object through the remote-sensing motion detection apparatus. Here, the broad explanation of the first motion signature information may comprise any motion related information of motion and motion object applicable to the present invention and can uniquely identify the motion object. The second motion signature information should also be doing the same explanation, it acquires through the motion of the motion object detected by the other device that is to be connected with the detection device, thus also may comprise any motion related information of motion and motion object applicable to the present invention and can uniquely identify the motion object.

Specifically, the first motion signature information based on, but not limited to, at least any of the following, 1) the basic motion signature related information of the motion object, that is the information related to the basic motion signature of the motion object, wherein, the basic motion signature including speed, acceleration, direction etc.

2) the motion trajectory related information of the motion object, that is the information related to the motion trajectory of the motion object, wherein, the motion trajectory including the motion trajectory of the motion object, the basic motion signature trajectory of the motion object, such as the trajectory of speed, acceleration, direction etc.

Further, the motion trajectory related information including but not limited to, at least any of the following, a) the motion trajectory of the motion object, including the motion trajectory of the motion object and all the motion signatures trajectorys of the motion object.

b) the prominent signature information of the motion object trajectory including the related signature information of the folding points in each motion trajectory, such as the speed, acceleration, direction, time of occurrence and relative location, wherein, a folding point is a local peak or valley in each motion trajectory.

c) the global signature information of the motion object trajectory including the signature information acquired by the complete trajectory of each of motion trajectory, such as the sloshing frequency, amplitude, speed variance, etc. of the motion object.

3) the motion pattern related information of the motion object, that is the information related to the motion pattern of the motion object, wherein, the motion pattern including the sloshing times of the motion object, more specifically, the sloshing times of the motion object within a predetermined time.

4) the motion trend related information of the motion object, that is the information related to the motion trend of the motion object, wherein, the motion trend including the trend of the motion signature, such as speed trends, acceleration trends, as well as motion trajectory trends.

Here, the way that the detection device acquires the first motion signature information of the motion object shall at least comprise the following, 1) the remote-sensing motion detection apparatus sends the specific wave, such as ultrasound, radio wave, etc., acquires the first motion signature information of the motion object by detecting the specific wave reflection.

2) the remote-sensing motion detection apparatus captures the motion image of the motion object, such as the two-dimensional or three-dimensional camera captures the motion image of the motion object, then base on which acquires the first motion signature information of the motion object. Wherein, the ways acquire the first motion signature information on the basis of the motion image shall at least comprise the following, a) detects the motion object in the motion image, tracking the motion of the motion object through a variety of existing video tracking algorithm and acquiring its first motion signature information.

b) analyzes the motion or the motion area of the motion image to acquire the first motion signature information. Wherein, the analysis of the motion area of the motion image may use the optical flow analysis etc. to segment the different motion area of the motion image, or detects the motion of the motion image to take the overall motion detection and speed as the motion signature information of the whole motion image, which motion signature information shall be taken as the first motion signature information of the motion object. For example, using the pixels motion of the whole motion image, takes the size and direction of the most votes as the first motion signature information of the motion object. Further, the motion pattern of the image or motion area shall also be considered. Specifically, when the motion pattern of the multi-frame motion image or the motion area in it is effective, generates the motion signature information of the motion image or the motion area on the basis of the motion pattern, takes it as the first motion signature information of the motion object. For example, the image motion (or a sufficiently large area) within one second is the continuously horizontal left and right motion for 3-5 times back and forth enough times within one second, then determines the horizontal motion is an effective motion pattern, then generates the motion signature information on the basis of the sloshing pattern, takes which as the first motion signature information of the motion object. Further, the motion signature information of the whole motion image or the motion area can be combined with the sloshing pattern to generate the final motion signature information, which shall be taken as the first motion signature information of the motion object.

It should be noted that the remote-sensing motion detection apparatus or the detection device can analyze the above motion image and acquire the first motion signature information of the motion object, depending on the ability of the remote-sensing motion detection apparatus and/or the work efficiency between the remote-sensing motion detection apparatus and the detection device.

In step S302, when the first motion signature information of the motion object acquired by the detection device matches with the second motion signature information of the motion object acquired by the other device, the detection device establishes connection with the other device.

Here, the detection device, the other device or the intermediate server may match the first motion signature information and the second motion signature information. Specifically, 1) the detection device may receive the second motion signature information of the motion object acquired by the other device, when the first motion signature information and the second motion signature information matches, the detection device establishes connection with the other device.

Alternatively, after receive the second motion signature information of the motion object acquired by the other device, the detection device can also send the first motion signature information and the second motion signature information to the first intermediate server for matching, when the two match, the detection device establishes connection with the other device. Here, the first intermediate server may send the matching result back to the detection device, if the two match, the detection device establishes connection with the other device accordingly.

In one example, the other device sends a connection request to the detection device, the connection request includes the second motion signature of the motion object acquired by the other device, the detection device may match the first motion signature information and the second motion signature information or transmit the first motion signature information and the second motion signature information to the first intermediate server for matching, when the two match, the detection device establishes connection with the other device sent the connection request.

Here, the other device may send the connection request via any existing communication mode to the detection device, such as Bluetooth mode, broadcast mode and so on.

2) the detection device sends the first motion signature information acquired by its motion object detection to the other device, when the first motion signature information and the second motion signature information match, the detection device establishes connection with the other device.

Alternatively, the detection device sends the first motion signature information acquired by its detected motion object to the other device to be established connection, the other device sends the acquired second motion signature information of the motion object and the first motion signature information to the second intermediate server for matching, when the first motion signature information and the second motion signature information match, the detection device establishes connection with the other device. Here, the second intermediate server may send the matching result back to the other device, if the two match, the detection device establishes connection with the other device accordingly.

In one example, the detection device sends a connection request to the other device, the connection request includes the first motion signature information of the motion object acquired by the detection device, the other device can match the first motion signature information and the second motion signature information or transmit the first motion signature information and the second motion signature information to the second intermediate server for matching, when the two match, the other device establishes connection with the detection device.

Preferably, in above 1) and 2), the detection device or other device to be connected for matching, the detection device and the other device can further divide the respectively acquired first motion signature information and the second motion signature information into more sections, and sends part of the motion signature information to the other, the motion signature information the two sent shall be different. For example, divide the first motion signature information and the second motion signature information into two sections, the detection device sends the first part of the first motion signature information to the other device to be connected, the other device sends the second part of the second motion signature information to the detection device, the two devices both match the received part motion signature information with their acquired motion signature information, when the two match, the two devices establish connection.

3) the detection device and the other device respectively send the first motion signature information and the second motion signature information acquired by their motion object to the third intermediate server, acquires the matching result of the first motion signature information and the second motion signature information from the third intermediate server, when the two match, the detection device establishes connection with the other device.

Here, the detection device can directly establish connection with the other device, if the two can not communicate directly, the connection shall be established via the third intermediate server, further, the third intermediate server can establish the connection first, then the two can establish connection directly via the communication mode that both support.

In one example, the detection device and the other device respectively detect and acquire the first motion signature information and the second motion signature information of the motion object, then send the respectively acquired first motion signature information and the second motion signature information to the third intermediate server, the third intermediate server matches the first motion signature information and the second motion signature information and sends the matching result back to the detection device and the other device, the matching result also includes the device ID information of the other side, when the two match, the detection device and the other device send a connection request to each other on the basis of each other's the device ID information in the matching result to establish connection.

In another example, in the case of the detection device can not directly communicate with the other device to be connected, the detection device can establish connection with the other device via the third intermediate server. Further, the detection device may then establish a direct connection with the other device.

For example, after the connection is established via the third intermediate server, the third intermediate server acquires the communication mode and the corresponding connection information of the detection device and the connected other device, and thus notice the common communication mode and the corresponding connection information to the detection device and the other device, then the detection device and the other device select the best communication mode to establish connection directly, such as selecting the best communication mode according to the service type and the default (system or user default). Wherein, the third intermediate server may pre-store the communication mode and the corresponding connection information of each device, also may request the detection device and the other device for the respective communication mode and the corresponding connection information. In addition, the third intermediate server may determine whether the connected device (such as the detection device and the connected other device) can establish local connection or direct connection via a network address (such as a subnet IP address) of the device, the current location. When the third intermediate server determines the connected devices can be directly connected, the third intermediate server sends the required connection related information (such as each other's subnet IP address) and authorized service type to the detection device and the connected other device.

Alternatively, the third intermediate server can only establish connection between the detection device and the other device to be connected, no matching. For example, detects the detection device and the other device respectively and acquires the first motion signature information and the second motion signature information of the motion object, then respectively sends their acquired first motion signature information and the second motion signature information to the third intermediate server, the third intermediate server packets devices on the basis of the additional information like the motion time related information and device location related information etc. and broadcasts the motion signature information sent by these devices which shall match the detected motion signature information and each motion signature information broadcasted by the third intermediate server and determine the corresponding devices to be connected respectively, such as the detection device matches the detected first motion signature information and the other device acquired second motion signature information broadcasted by the third intermediate server, then determines the corresponding device to be connected and establishes connection with it directly or via a third intermediate server.

It should be noted that the first, second, third intermediate server may be the same intermediate server, providing matching service to all devices, or may be the different intermediate server, providing matching service to different request devices on the basis of practical requirement respectively.

A preferred exemplary embodiment of the method shown in FIG. 3 can encode the first motion signature information and the second motion signature information respectively and match the two encoded information, when the two match, the detection device establishes connection with the other device. For convenience of description, herein, the encoded motion signature information sometimes referred to as motion signature, and the first motion signature and the second motion signature corresponding to the first motion signature information and the second motion signature information respectively.

For example, the motion trajectory may be encoded on the graphic shape and contour. Further, it also may be encoded on the combination of time series sequence and the graphic shape, such as encoding on the basis of the combination of the generation time sequence of each section graphic shape and the graphic shape in the corresponding time, then generates trajectorys in different sequence to effect the output encoding. Here, the encoding method including but not limited to Fourier shape descriptor method, geometric parameter method, shape invariant moment method, rotation function method, wavelet descriptor method, etc.

For example, encoding the speed, acceleration and direction trend etc. The encoding of the speed, acceleration and direction trend can eliminate the encoding influence caused by different devices detection, such as use up (+1), even (0), down (−1) etc. to describe the trend. Specific implementation such as, $C=A1-A2$, wherein, c is the differential encoding, A1 and A2, such as the speed and acceleration. Further, two-value or three-value C, such as take +1, 0, −1. For example, for the speeds of the motion object at four times, the detection device and the MEMS device respectively detect and acquires the first motion signature information 1231 and the second motion signature information 2342, then differential encodes these two motion signature information and acquires the same motion signature, 11-2. As another example, for the accelerations of the motion object at four times, the detection device and the MEMS device respectively detect and acquires the first motion signature information 1231 and the second motion signature information 1353, these two motion signature information differential encodes and acquires different motion signatures, but they have the same two-value or three-value difference, 11-1. Further use the encoding combines speed and direction change, e.g., the three speed (or acceleration) trends are acceleration (+1), uniform (0) and deceleration (−1), so there are three corresponding encodings, the three direction trends are up (+1), even (0) and down (−1), so there are three corresponding encodings, thus will get more encodings after the combination of the two, such as acceleration up (4), acceleration even (3), acceleration down (2), uniform up (1), uniform even (0), uniform down (−1), deceleration up (−2), deceleration even (−3), deceleration down (−4) and so on to describe motion changes.

Further, conversion of the encoded motion signature information (motion signature), such as according to the requirements of the matched device. For example, a signature encoded on the motion trajectory combines with each motion time can calculate the speed, acceleration, prominent feature, global feature of the motion at each position, then converts the motion signature on the basis of the motion trajectory to the motion signature on the basis of the other motion signature information. In this regard, when the detection device acquires the motion signature on the basis of the motion trajectory, and the third intermediate server required motion signature to be matched on the basis of the motion signature of the motion trajectory prominent feature, the detection device may correspondingly convert the acquired motion signature and then submits it to the third intermediate server to match.

Another preferred exemplary embodiment of the method shown in FIG. 3, when the detection device can communicate directly with the other device, the detection device can determines the candidate device to be connected via auxiliary information of connection, and then when the second motion signature information of the motion object acquired by the candidate device matches with the first motion signature information, the matched candidate device is the other device to be communicated with the detection device, and to establish connection with the other device.

When there are more device send connection request to the detection device, the detection device can screen these devices on the basis of auxiliary information of connection and determine the candidate device to be connected, and when the second motion signature information of the motion object acquired by the candidate device matches with the first motion signature information of the motion object acquired by the detection device, take the matched candidate device as the connection target device and establish connection with it.

Wherein, the auxiliary information of connection including but not limited to, at least any of the following, 1) motion related time information, such as the start time, end time, duration etc. of the motion.

2) motion related position information, such as the position of the detection device, the position of the motion object and the position of the candidate device.

3) device related information, such as the identification information of the candidate device, such as device ID, IP and so on.

4) device connection related information, such as a candidate device's network connection information, connection permission and connection history, wherein, connection history includes the connection frequency between devices, according to which may screen out the candidate devices often connected thereto.

One more preferred exemplary embodiment of the method shown in FIG. 3, there are more other devices to be established connection with the detection device, such as more MEMS devices send the second motion signature information of its motion to the detection device. The detection device acquires the first motion signature information of MEMS device via the remote-sensing motion detection apparatus, when each of the first motion signature information matches with a second motion signature information, the detection device establishes connection with the MEMS device corresponding to the matched second motion signature information.

Here, the detection device or the remote-sensing motion detection apparatus may track the motion of more MEMS devices by motion tracking algorithm, and thereby acquire the first motion signature information of each MEMS device. Further, when the motion detection for a MEMS device is sufficient to generate the corresponding first motion signature information, the motion detection to the MEMS device can be stopped to save computing resource for calculating of the first motion signature information of other MEMS devices.

In addition, after more MEMS devices establish connection with the detection device, the detection device can be used to establish connection between each other, such as the detection device transfers messages between these MEMS devices.

Alternatively, the detection device broadcasts the connection related information (such as device identification information) of the MEMS device that established connection with the detection device to these MEMS devices for a direct connection between their mutual.

A preferred exemplary embodiment of the method shown in FIG. 3, when the predetermined connection triggering criterion is satisfied, the detection device is ready to establish connection with the other device, then starts to acquire the first motion signature information of the motion object. Here, the connection triggering criterion including but not limited to any acquisition condition of the first motion signature information of the motion object that trigger the detection device activation and applicable in the present invention, such as a user clicks on a particular button, detects a predetermined detection object or motion mode etc.

Specifically, the connection triggering criterion including, but not limited to, at least any of the following, 1) detects a predetermined detection object, which including but not limited to any specific object can be detected and determined by the remote-sensing motion detection apparatus and applicable in the present invention, such as people hand, people face, mobile phone etc. Specifically, the detection object including but not limited to, at least any of the following, a) people hand.

b) people face.

c) gesture.

The pre-trained classifier can be used to identify people hand, people face and gesture. Specifically, feature extract and train a large number of predetermined detection object and non-detection object to generate the classifier, use the classifier to distinguish the detected object and determine the predetermined detection object and non-detection object. Wherein the extracted features can use Han-like, HOG, LBP etc. and training methods can use LDA, SVM, Adaboost etc.

In addition, for the detection of the object shape, extract edges first, then match template to identify the shape. Wherein, the template matching can use Haussdorff or Chafer distance matching etc. methods. For the detection of a certain shape of an object, can combine the above shape detection and object recognition methods, such as detect the shape first, then recognize the object for the candidate objects belonging to the predetermined shape.

d) the light-emitting unit has a specific light-emitting mode. Here, the light-emitting unit including but not limited to LED, OLED, etc. visible light, the specific light-emitting mode including but not limited to a specific color, brightness, shape, size, flashing frequency etc. of the light-emitting unit imaging spot in the image, and combinations thereof. For example, the flash of the MEMS device is turned on and flashing in a specific frequency, when the detection device detects the flash above, the remote-sensing motion detection apparatus acquires the first motion signature information of the MEMS device.

2) detects a predetermined motion pattern, such as the sloshing times within a predetermined time (such as three times in one second), sloshing mode (such as sloshing to the left three times, sloshing to the right three times).

For example, the MEMS device has MEMS and Bluetooth, the detection device has imaging and Bluetooth, the MEMS device detects its own motion by MEMS, the detection device capture the motion of the MEMS device by imaging, when the MEMS device and the detection device detect the specific motion pattern of the predetermined detection object, start the search connection of Bluetooth, the MEMS device sets Bluetooth name to the preset value, the detection device searches the MEMS device through the preset Bluetooth name, when the detection device finds the MEMS device via Bluetooth, the two devices Bluetooth match via the motion signature information of the MEMS device detected by each device, when they match, the two devices can establish connection.

Another preferred exemplary embodiment of the method shown in FIG. 3, after the connection is established, the detection device and the other device are connected for data transmission, for subsequent application. When the detection device establishes connection with the other device through the motion detection of the motion object, the various data can be transmitted between the detection device and the other device to achieve specific application, such as data sharing, devices control etc. In this case, the detection device and the device to be connected can take the detected first motion signature information and the second motion signature information as the connection key, authentication key, executive command code etc. when the two match, the two devices establish connection and then transmit data.

For example, after the connection is established, the detection device and the other device share the network configuration information to access the same network. Specifically, when the two devices are not in the same network, a device (such as the detection device) sends its local area network configuration information (such as security authentication information) to the other device (such as the MEMS device) by communication mode of near field communication (such as Infrared, Bluetooth, NFC, etc.), so that the other device can access to the LAN, and therefore the two devices in the same LAN. This mode does not require a key or setup and improves the connection speed and control speed between the two devices. Further, the device in the LAN (such as the detection device) may also send its LAN network configuration information to an intermediate server, which shall transmit the network configuration information to the device to establish connection with the other device (such as the MEMS devices), for the other device to access the LAN.

For example, when it is detected that the detection device and the other device jointly support other communication mode, which shall be used to transmit data with the other device. Specifically, after the connection is established, the detection device and its connected other device detect the two devices both support Bluetooth, Infrared etc. communication modes, Bluetooth or Infrared may be selected to transmit data between the two on the basis of the data size to be transmitted.

A preferred exemplary embodiment of the method shown in FIG. 3, when the predetermined disconnection criterion is satisfied, the detection device disconnect from the other device. In this case, the disconnection criterion including but not limited to, any of the following, 1) predetermined disconnection time, when there is no operation within a certain period of time, the connection will automatically disconnect, 2) using place information, such as determine the device has left the place of use range through the GPS information on the MEMS device, 3) a user's motion operation on repeat connection, such as the detection of the user re-sloshes the MEMS device, the connection status is disconnected, 4) receive the disconnect instruction from the node or server, 5) the near field communication of the two indicates that the current device is no longer in each other's connection scope, the connected device can use Bluetooth, infrared and other short-range communication to detect whether the connection is still available, if the current device is no longer in this range, the connection can be disconnected.

Figure 4:
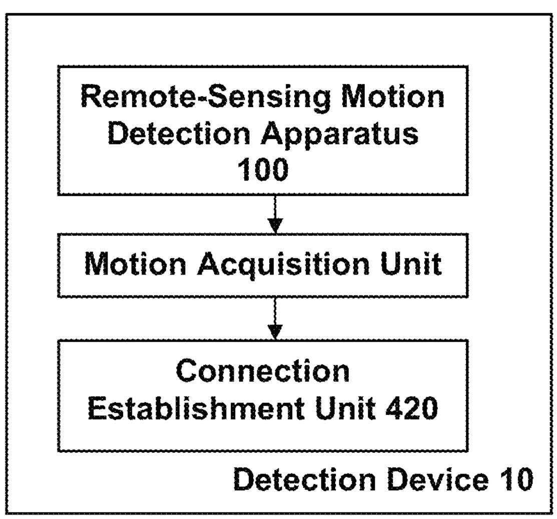
FIG. 4 illustrates an apparatus diagram according to another preferred embodiment of the present invention.

FIG. 4 illustrates an apparatus diagram according to another embodiment of the present invention.

As shown in FIG. 4, a remote-sensing motion detection apparatus 100 is built in the detection device 10, the detection device 10 also comprises a motion acquisition unit 410 and a connection establishment unit 420.

Specifically, the motion acquisition unit 410 acquires the first motion signature information of the motion object by the remote-sensing motion detection apparatus 100. Here, the broad explanation of the first motion signature information may comprise any motion related information of motion and motion object applicable to the present invention and can uniquely identify the motion object. The second motion signature information should also be doing the same explanation, it acquires through the motion of the motion object detected by the other device that is to be connected with the detection device, thus also may comprise any motion related information of motion and motion object applicable to the present invention and can uniquely identify the motion object.

Specifically, the first motion signature information based on, but not limited to, at least any of the following, 1) the basic motion signature related information of the motion object, that is the information related to the basic motion signature of the motion object, wherein, the basic motion signature including speed, acceleration, direction etc.

2) the motion trajectory related information of the motion object, that is the information related to the motion trajectory of the motion object, wherein, the motion trajectory including the motion trajectory of the motion object, the basic motion signature trajectory of the motion object, such as the trajectory of speed, acceleration, direction etc.

Further, the motion trajectory related information including but not limited to, at least any of the following, a) the motion trajectory of the motion object, including the motion trajectory of the motion object and all the motion signatures trajectorys of the motion object.

b) the prominent signature information of the motion object trajectory including the related signature information of the folding points in each motion trajectory, such as the speed, acceleration, direction, time of occurrence and relative location, wherein, a folding point is a local peak or valley in each motion trajectory.

c) the global signature information of the motion object trajectory including the signature information acquired by the complete trajectory of each of motion trajectory, such as the sloshing frequency, amplitude, speed variance, etc. of the motion object.

3) the motion pattern related information of the motion object, that is the information related to the motion pattern of the motion object, wherein, the motion pattern including the sloshing times of the motion object, more specifically, the sloshing times of the motion object within a predetermined time.

4) the motion trend related information of the motion object, that is the information related to the motion trend of the motion object, wherein, the motion trend including the trend of the motion signature, such as speed trends, acceleration trends, as well as motion trajectory trends.

Here, the way that the motion acquisition unit 410 acquires the first motion signature information of the motion object shall at least comprise the following, 1) the remote-sensing motion detection apparatus 100 sends the specific wave, such as ultrasound, radio wave, etc., acquires the first motion signature information of the motion object by detecting the specific wave reflection.

2) the remote-sensing motion detection apparatus 100 captures the motion image of the motion object, such as the two-dimensional or three-dimensional camera captures the motion image of the motion object, then base on which acquires the first motion signature information of the motion object. Wherein, the ways acquire the first motion signature information on the basis of the motion image shall at least comprise the following, a) detects the motion object in the motion image, tracking the motion of the motion object through a variety of existing video tracking algorithm and acquiring its first motion signature information.

b) analyzes the motion or the motion area of the motion image to acquire the first motion signature information. Wherein, the analysis of the motion area of the motion image may use the optical flow analysis etc. to segment the different motion area of the motion image, or detects the motion of the motion image to take the overall motion detection and speed as the motion signature information of the whole motion image, which motion signature information shall be taken as the first motion signature information of the motion object. For example, using the pixels motion of the whole motion image, takes the size and direction of the most votes as the first motion signature information of the motion object. Further, the motion pattern of the image or motion area shall also be considered. Specifically, when the motion pattern of the multi-frame motion image or the motion area in it is effective, generates the motion signature information of the motion image or the motion area on the basis of the motion pattern, takes it as the first motion signature information of the motion object. For example, the image motion (or a sufficiently large area) within one second is the continuously horizontal left and right motion for 3-5 times back and forth enough times within one second, then determines the horizontal motion is an effective motion pattern, then generates the motion signature information on the basis of the sloshing pattern, takes which as the first motion signature information of the motion object. Further, the motion signature information of the whole motion image or the motion area can be combined with the sloshing pattern to generate the final motion signature information, which shall be taken as the first motion signature information of the motion object.

It should be noted that the remote-sensing motion detection apparatus or the motion acquisition unit can analyze the above motion image and acquire the first motion signature information of the motion object, depending on the ability of the remote-sensing motion detection apparatus and/or the work efficiency between the remote-sensing motion detection apparatus and the motion acquisition unit.

When the first motion signature information of the motion object acquired by the motion acquisition unit 410 matches with the second motion signature information of the motion object acquired by the other device, the connection establishment unit 420 establishes connection with the other device.

Here, the connection establishment unit 420 of the detection device 10, the other device or the intermediate server may match the first motion signature information and the second motion signature information. Specifically, 1) the connection establishment unit 420 may further comprise the feature receiving unit (not shown) and the first connection unit (not shown). The feature receiving unit may receive the second motion signature information of the motion object acquired by the other device, when the first motion signature information and the second motion signature information matches, the first connection unit establishes connection with the other device.

Alternatively, after the feature receiving unit receives the second motion signature information of the motion object acquired by the other device, the first connection unit can also send the first motion signature information and the second motion signature information to the first intermediate server for matching, when the two match, the first connection unit establishes connection with the other device. Here, the first intermediate server may send the matching result back to the detection device 10, if the two match, the detection device 10 establishes connection with the other device accordingly.

In one example, the other device sends a connection request to the detection device 10, the connection request includes the second motion signature of the motion object acquired by the other device, the connection establishment unit 420 may match the first motion signature information and the second motion signature information or transmit the first motion signature information and the second motion signature information to the first intermediate server for matching, when the two match, the detection device 10 establishes connection with the other device sent the connection request.

Here, the other device may send the connection request via any existing communication mode to the detection device 10, such as Bluetooth mode, broadcast mode and so on.

2) the connection establishment unit 420 may further comprise the feature transmission unit (not shown) and the second connection unit (not shown). The feature transmission unit sends the first motion signature information acquired by its motion object detection to the other device, when the first motion signature information and the second motion signature information match, the second connection unit establishes connection with the other device.

Alternatively, the feature transmission unit sends the first motion signature information of the motion object acquired by the motion acquisition unit 410 to the other device to be established connection, the other device sends the acquired second motion signature information of the motion object and the first motion signature information to the second intermediate server for matching, when the first motion signature information and the second motion signature information match, the detection device 10 establishes connection with the other device. Here, the second intermediate server may send the matching result back to the other device, if the two match, the detection device 10 establishes connection with the other device accordingly.

In one example, the feature transmission unit of the detection device 10 sends a connection request to the other device, the connection request includes the first motion signature information of the motion object acquired by the detection device, the other device can match the first motion signature information and the second motion signature information or transmit the first motion signature information and the second motion signature information to the second intermediate server for matching, when the two match, the other device establishes connection with the detection device 10.

Preferably, in above 1) and 2), the detection device or other device to be connected for matching, the detection device and the other device can further divide the respectively acquired first motion signature information and the second motion signature information into more sections, and sends part of the motion signature information to the other, the motion signature information the two sent shall be different. For example, divide the first motion signature information and the second motion signature information into two sections, the detection device sends the first part of the first motion signature information to the other device to be connected, the other device sends the second part of the second motion signature information to the detection device, the two devices both match the received part motion signature information with their acquired motion signature information, when the two match, the two devices establish connection.

3) the connection establishment unit 420 of the detection device 10 sends the first motion signature information acquired by the motion object to the third intermediate server, the other device also sends the second motion signature information acquired by the motion object to the third intermediate server, the connection establishment unit 420 acquires the matching result of the first motion signature information and the second motion signature information from the third intermediate server, when the two match, the connection establishment unit 420 establishes connection with the other device.

In one example, the connection establishment unit 420 of the detection device 10 sends the first motion signature information of the motion object to the third intermediate server, the other device also sends the second motion signature information of the motion object to the third intermediate server, the third intermediate server matches the first motion signature information and the second motion signature information and sends the matching result back to the detection device and the other device, the matching result also includes the device ID information of the other side, when the two match, the connection establishment unit 420 of the detection device 10 and the other device send a connection request to each other on the basis of each other's the device ID information in the matching result to establish connection.

Further, in the case of the detection device 10 can not directly communicate with the other device to be connected, the connection establishment unit 420 can establish connection with the other device via the third intermediate server.

Alternatively, the third intermediate server can only establish connection between the detection device and the other device to be connected, no matching. For example, the connection establishment unit 420 of the detection device 10 sends the first motion signature information acquired by the motion object to the third intermediate server, the other device also sends the second motion signature information acquired by the motion object to the third intermediate server, the third intermediate server packets devices on the basis of the additional information like the motion time related information and device location related information etc. and broadcasts the motion signature information sent by these devices which shall match the detected motion signature information and each motion signature information broadcasted by the third intermediate server and determine the corresponding devices to be connected respectively, such as the connection establishment unit 420 matches the motion acquisition unit 410 detected first motion signature information and the other device acquired second motion signature information broadcasted by the third intermediate server, then determines the corresponding device to be connected and establishes connection with it directly or via a third intermediate server.

It should be noted that the first, second, third intermediate server may be the same intermediate server, providing matching service to all devices, or may be the different intermediate server, providing matching service to different request devices on the basis of practical requirement respectively.

A preferred example of the apparatus embodiment shown in FIG. 4, the detection device 10 and the other device to be connection may both comprise encoding unit (not shown), each encoding unit can encode the first motion signature information and the second motion signature information respectively and match the two encoded information, when the two match, the connection establishment unit 420 of the detection device establishes connection with the other device. For convenience of description, herein, the encoded motion signature information sometimes referred to as motion signature, and the first motion signature and the second motion signature corresponding to the first motion signature information and the second motion signature information respectively.

For example, the motion trajectory may be encoded on the graphic shape and contour. Further, it also may be encoded on the combination of time series sequence and the graphic shape, such as encoding on the basis of the combination of the generation time sequence of each section graphic shape and the graphic shape in the corresponding time, then generates trajectorys in different sequence to effect the output encoding. Here, the encoding method including but not limited to Fourier shape descriptor method, geometric parameter method, shape invariant moment method, rotation function method, wavelet descriptor method, etc.

For example, encoding the speed, acceleration and direction trend etc. The encoding of the speed, acceleration and direction trend can eliminate the encoding influence caused by different devices detection, such as use up (+1), even (0), down (−1) etc. to describe the trend. Specific implementation such as, C=A1−A2, wherein, c is the differential encoding, A1 and A2, such as the speed and acceleration. Further, two-value or three-value C, such as take +1, 0, −1. For example, for the speeds of the motion object at four times, the detection device and the MEMS device respectively detect and acquires the first motion signature information 1231 and the second motion signature information 2342, then differential encodes these two motion signature information and acquires the same motion signature, 11-2. As another example, for the accelerations of the motion object at four times, the detection device and the MEMS device respectively detect and acquires the first motion signature information 1231 and the second motion signature information 1353, these two motion signature information differential encodes and acquires different motion signatures, but they have the same two-value or three-value difference, 11-1. Further use the encoding combines speed and direction change, e.g., the three speed (or acceleration) trends are acceleration (+1), uniform (0) and deceleration (−1), so there are three corresponding encodings, the three direction trends are up (+1), even (0) and down (−1), so there are three corresponding encodings, thus will get more encodings after the combination of the two, such as acceleration up (4), acceleration even (3), acceleration down (2), uniform up (1), uniform even (0), uniform down (−1), deceleration up (−2), deceleration even (−3), deceleration down (−4) and so on to describe motion changes.

Further, conversion of the encoded motion signature information (motion signature), such as according to the requirements of the matched device. For example, a signature encoded on the motion trajectory combines with each motion time can calculate the speed, acceleration, prominent feature, global feature of the motion at each position, then converts the motion signature on the basis of the motion trajectory to the motion signature on the basis of the other motion signature information. In this regard, when the detection device acquires the motion signature on the basis of the motion trajectory, and the third intermediate server required motion signature to be matched on the basis of the motion signature of the motion trajectory prominent feature, the detection device may correspondingly convert the acquired motion signature and then submits it to the third intermediate server to match.

Another preferred exemplary embodiment of the apparatus example shown in FIG. 4, when the detection device can communicate directly with the other device, the connection establishment unit 420 can determines the candidate device to be connected via the auxiliary information of connection, and then when the second motion signature information of the motion object acquired by the candidate device matches with the first motion signature information, the matched candidate device is the other device to be communicated with the detection device, the connection establishment unit 420 establishes connection with the other device.

When there are more device send connection request to the detection device 10, the connection establishment unit 420 can screen these devices on the basis of the auxiliary information of connection and determine the candidate device to be connected, and when the second motion signature information of the motion object acquired by the candidate device matches with the first motion signature information of the motion object acquired by the detection device, the connection establishment unit 420 takes the matched candidate device as the connection target device and establishes connection with it.

Wherein, the auxiliary information of connection including but not limited to, at least any of the following, 1) motion related time information, such as the start time, end time, duration etc. of the motion.

2) motion related position information, such as the position of the detection device, the position of the motion object and the position of the candidate device.

3) device related information, such as the identification information of the candidate device, such as device ID, IP and so on.

4) device connection related information, such as a candidate device's network connection information, connection permission and connection history, wherein, connection history includes the connection frequency between devices, according to which may screen out the candidate devices often connected thereto.

One more preferred exemplary embodiment of the apparatus example shown in FIG. 4, there are more other devices to be established connection with the detection device, such as more MEMS devices 20 send the second motion signature information of its motion to the detection device 10. The motion acquisition unit 410 acquires the first motion signature information of MEMS device 20 via the remote-sensing motion detection apparatus 100, when each of the first motion signature information matches with a second motion signature information, the connection establishment unit 420 establishes connection with the MEMS device corresponding to the matched second motion signature information.

Here, the motion acquisition unit 410 or the remote-sensing motion detection apparatus 100 may track the motion of more MEMS devices 20 by motion tracking algorithm, and thereby acquire the first motion signature information of each MEMS device 20. Further, when the motion detection for a MEMS device is sufficient to generate the corresponding first motion signature information, the motion detection to the MEMS device can be stopped to save computing resource for calculating of the first motion signature information of other MEMS devices.

In addition, the detection device 10 may also comprise the connection auxiliary apparatus (not shown). After more MEMS devices establish connection with the detection device, the connection auxiliary apparatus can be used to establish connection between each other, such as the detection device transfers messages between these MEMS devices.

Alternatively, the detection device 10 may also comprise the connection related transmission unit (not shown). The connection related transmission unit broadcasts the connection related information (such as device identification information) of the MEMS device that established connection with the detection device 10 to these MEMS devices for a direct connection between their mutual.

A preferred exemplary embodiment of the apparatus example shown in FIG. 4, the detection device 10 may also comprise the connection triggering unit (not shown). When the connection triggering unit satisfies the predetermined connection triggering criterion, the detection device 10 is ready to establish connection with the other device, then starts to acquire the first motion signature information of the motion object. Here, the connection triggering criterion including but not limited to any acquisition condition of the first motion signature information of the motion object that trigger the detection device activation 10 and applicable in the present invention, such as a user clicks on a particular button, detects a predetermined detection object or motion mode etc.

Specifically, the connection triggering criterion including, but not limited to, at least any of the following, 1) detects a predetermined detection object, which including but not limited to any specific object can be detected and determined by the remote-sensing motion detection apparatus 100 and applicable in the present invention, such as people hand, people face, mobile phone etc. Specifically, the detection object including but not limited to, at least any of the following, a) people hand.

b) people face.

c) gesture.

The pre-trained classifier can be used to identify people hand, people face and gesture. Specifically, feature extract and train a large number of predetermined detection object and non-detection object to generate the classifier, use the classifier to distinguish the detected object and determine the predetermined detection object and non-detection object. Wherein the extracted features can use Han-like, HOG, LBP etc. and training methods can use LDA, SVM, Adaboost etc.

In addition, for the detection of the object shape, extract edges first, then match template to identify the shape. Wherein, the template matching can use Haussdorff or Chafer distance matching etc. methods. For the detection of a certain shape of an object, can combine the above shape detection and object recognition methods, such as detect the shape first, then recognize the object for the candidate objects belonging to the predetermined shape.

d) the light-emitting unit has a specific light-emitting mode. Here, the light-emitting unit including but not limited to LED, OLED, etc. visible light, the specific light-emitting mode including but not limited to a specific color, brightness, shape, size, flashing frequency etc. of the light-emitting unit imaging spot in the image, and combinations thereof. For example, the flash of the MEMS device is turned on and flashing in a specific frequency, when the detection device detects the flash above, the remote-sensing motion detection apparatus acquires the first motion signature information of the MEMS device.

2) detects a predetermined motion pattern, such as the sloshing times within a predetermined time (such as three times in one second), sloshing mode (such as sloshing to the left three times, sloshing to the right three times).

For example, the MEMS device 20 has MEMS and Bluetooth, the detection device 10 has imaging and Bluetooth, the MEMS device 20 detects its own motion by MEMS, the detection device 10 capture the motion of the MEMS device by imaging, when the MEMS device 20 and the detection device 10 detect the specific motion pattern of the predetermined detection object, start the search connection of Bluetooth, the MEMS device 20 sets Bluetooth name to the preset value, the detection device 10 searches the MEMS device 20 through the preset Bluetooth name, when the detection device 10 finds the MEMS device 20 via Bluetooth, the two devices Bluetooth match via the motion signature information of the MEMS device detected by each device, when they match, the two devices can establish connection.

Another preferred exemplary embodiment of the apparatus shown in FIG. 4, the detection device may also comprise the application unit (not shown). After the connection is established, the application unit transmits data with the other device connected with the detection device 10 for subsequent application. When the connection establishment unit 420 establishes connection with the other device through the motion detection of the motion object, the various data can be transmitted between the application unit and the other device to achieve specific application, such as data sharing, devices control etc. In this case, the detection device and the device to be connected can take the detected first motion signature information and the second motion signature information as the connection key, authentication key, executive command code etc. when the two match, the two devices establish connection and then transmit data.

For example, after the connection is established, the application unit and the other device share the network configuration information to access the same network. Specifically, when the two devices are not in the same network, the application unit of a device (such as the detection device) sends its local area network configuration information (such as security authentication information) to the other device (such as the MEMS device) by communication mode of near field communication (such as Infrared, Bluetooth, NFC, etc.), so that the other device can access to the LAN, and therefore the two devices in the same LAN. This mode does not require a key or setup and improves the connection speed and control speed between the two devices. Further, the device in the LAN (such as the detection device) may also send its LAN network configuration information to an intermediate server, which shall transmit the network configuration information to the device to establish connection with the other device (such as the MEMS devices), for the other device to access the LAN.

For example, when it is detected that the detection device 10 and the other device jointly support other communication mode, the application unit shall be used to transmit data with the other device. Specifically, after the connection is established, the detection device and its connected other device detect the two devices both support Bluetooth, Infrared etc. communication modes, Bluetooth or Infrared may be selected to transmit data between the two on the basis of the data size to be transmitted.

A preferred exemplary embodiment of the apparatus shown in FIG. 4, the detection device 10 may also comprise the disconnection unit (not shown). When the predetermined disconnection criterion is satisfied, the disconnection unit disconnects from the other device. In this case, the disconnection criterion including but not limited to, any of the following, 1) predetermined disconnection time, when there is no operation within a certain period of time, the connection will automatically disconnect, 2) using place information, such as determine the device has left the place of use range through the GPS information on the MEMS device, 3) a user's motion operation on repeat connection, such as the detection of the user re-sloshes the MEMS device, the connection status is disconnected, 4) receive the disconnect instruction from the node or server, 5) the near field communication of the two indicates that the current device is no longer in each other's connection scope, the connected device can use Bluetooth, infrared and other short-range communication to detect whether the connection is still available, if the current device is no longer in this range, the connection can be disconnected.

It should be noted that the present invention may be implemented in software and/or a combination of software and hardware, for example, can be implemented by application specific integrated circuit (ASIC), a general purpose computer, or any other similar hardware.

The software program of the present invention can be implemented by a processor to perform the steps or functions described hereinabove. Similarly, the software program of the present invention (including associated data structures) can be stored in the computer-readable recording media, for example, RAM memory, magneto-optical drive or floppy disk and similar devices. In addition, some steps or functions of the present invention may be implemented in hardware, such as implementation all steps or functions of the circuit by way of cooperating the processor.

In addition, part of the present invention may be applied as a computer program product, such as computer program instruction which can call or provide methods and/or technical solutions according to the invention by operating the computer when executed by a computer. The program instructions of the present invention calling method may be stored in fixed or removable recording media, and/or are transmitted in the data flow by radio or other signal bearing media, and/or stored in the working storage of the running computer equipment in accordance with the program instructions. Here, one embodiment of the present invention comprises an unit that can be used as a memory for storing computer program instructions and a processor for executing program instructions, wherein, when the computer program instructions being executed by the processor, trigger the device running according to the mentioned embodiments methods and/or technology programs of the present invention.

For skilled in the art, the present invention is clearly not limited to the details of the exemplary embodiments above, but without departing from the spirit or essential characteristics of the present invention, the present invention can be achieved in other specific forms. Therefore, whether from what point of view, the embodiments should be considered as exemplary and non-limiting, the scope of the present invention is defined by the attached claims rather than the above descriptions, therefore, the present invention intends to cover the meaning of claims equivalents and all the changes in the scope. Any reference signs of the claims should not be seen to restrict the referred claims. In addition, apparently the word "comprise" does not exclude other units or steps, the singular does not exclude the plurality. In the device claims, more units or devices can be realized through one unit or device by means of software or hardware. The words like "first", "second" etc. are used to express names but not any particular sequences.

I claim:

1. A system for connecting a plurality of devices, comprising:

a first device having a camera, an encoding unit, a transceiver, a connection establishment unit, a processor, and a non-transitory memory for storing computer readable instructions when executed by the processor enables the device to:

remotely capture, via the camera, motion information of a second device manipulated by a user in three-dimensional space along a trajectory;

encode, via the encoding unit, the remotely captured motion information into a corresponding first motion signature;

receive, via the transceiver, from the second device a second motion signature corresponding to said device's motion information;

match, via the connection establishment unit, the two motion signatures; and establish a connection, via the connection establishment unit, with the second device when a match between the two signatures is determined;

the second device having a MEMS motion sensor, an encoding unit, a transceiver, a connection establishment unit, a processor, and a non-transitory memory for storing computer readable instructions when executed by the processor enables the device to:

capture, via the MEMS motion sensor, its motion information when the second device is manipulated by a user in three-dimensional space along a trajectory;

encode, via the encoding unit, the locally captured motion information into the corresponding second motion signature;

send, via the transceiver, to the first device said second motion signature;

and establish a connection, via the connection establishment unit, with the first device when a match between the first motion signature and said second motion signature is determined.

2. A system for connecting a plurality of devices, comprising: a first device having a camera, an encoding unit, a transceiver, a connection establishment unit, a processor, and a non-transitory memory for storing computer readable instructions when executed by the processor enables the device to:

remotely capture, via the camera, motion information of a second device manipulated by a user in three-dimensional space along a trajectory;

encode, via the encoding unit, the remotely captured motion information into a corresponding first motion signature;

send, via the transceiver, to the other device said first motion signature;

establish a connection, via the connection establishment unit, with the second device when a match between the two signatures is determined;

the second device having a M EMS motion sensor, an encoding unit, a transceiver, a connection establishment unit, a processor, and a non-transitory memory for storing computer readable instructions when executed by the processor enables the device to:

capture, via the MEMS motion sensor, its motion information when the second device is manipulated by a user in three-dimensional space along a trajectory;

encode, via the encoding unit, the locally captured motion information into the corresponding second motion signature;

receive, via the transceiver, from the first device the first motion signature;

match, via the connection establishment unit, the first and second motion signatures;

and establish a connection, via the connection establishment unit, with the first device when a match between the first motion signature and said second motion signature is determined.

3. A system for connecting a plurality of devices, comprising:

a first device having a camera, an encoding unit, a transceiver, a connection establishment unit, a processor, and a non-transitory memory for storing computer readable instructions when executed by the processor enables the device to:

remotely capture, via the camera, motion information of a second device manipulated by a user in three-dimensional space along a trajectory;

encode, via the encoding unit, the remotely captured motion information into a corresponding first motion signature and divide the first motion signature into a first section and a second section;

send, via the transceiver, to the second device said first section of the first motion signature;

receive, via the transceiver, from the second device a second section of a second motion signature corresponding to said second device's motion information;

match, via the connection establishment unit, the second section of the first motion signature and the second section of the second motion signature;

and establish a connection, via the connection establishment unit, with the second device when a match between the two signature sections is determined;

the second device having a MEMS motion sensor, an encoding unit, a transceiver, a connection establishment unit, a processor, and a non-transitory memory for storing computer readable instructions when executed by the processor enables the device to:

capture, via the MEMS motion sensor, its motion information when the second device is manipulated by a user in three-dimensional space along a trajectory;

encode, via the encoding unit, the locally captured motion information into the corresponding second motion signature and divide the second motion signature into a first section and a second section;

send, via the transceiver, to the first device said second section of the second motion signature;

receive, via the transceiver, from the first device the first section of the first motion signature;

match, via the connection establishment unit, the first section of the first motion signature and the first section of the second signature;

and establish a connection, via the connection establishment unit, with the first device when a match between said signature sections is determined.

4. A system for connecting a plurality of devices, comprising: a server having a transceiver, a processor, and a non-transitory memory for storing computer readable instructions when executed by the processor enables the device to:

receive, via the transceiver, a first and a second motion signature from a first device;

compare the two motion signatures to determine if they match;

and send, via the transceiver, to the first device the match result;

a first device having a camera, an encoding unit, a transceiver, a connection establishment unit, a processor, and a non-transitory memory for storing computer readable instructions when executed by the processor enables the device to:

remotely capture, via the camera, motion information of a second device manipulated by a user in three-dimensional space along a trajectory;

encode, via the encoding unit, the remotely captured motion information into a corresponding first motion signature;

receive, via the transceiver, from the second device a second motion signature corresponding to said device's motion information;

send, via the transceiver, to the server said first and second motion signatures;

receive, via the transceiver, from the server the result of its signature match;

and establish a connection, via the connection establishment unit, with the second device when a match between the two signatures is determined;

the second device having a MEMS motion sensor, an encoding unit, a transceiver, a connection establishment unit, a processor, and a non-transitory memory for storing computer readable instructions when executed by the processor enables the device to:

capture, via the MEMS motion sensor, its motion information when the second device is manipulated by a user in three-dimensional space along a trajectory;

encode, via the encoding unit, the locally captured motion information into the corresponding second motion signature; send, via the transceiver, to the first device said second motion signature; and establish a connection, via the connection establishment unit, with the first device when a match between the first motion signature and said second motion signature is determined.

5. A system for connecting a plurality of devices, comprising:

a server having a transceiver, a processor, and a non-transitory memory for storing computer readable instructions when executed by the processor enables the device to:

receive, via the transceiver, a first and a second motion signature from a first device; compare the two motion signatures to determine if they match;

and send, via the transceiver, to the first device the match result;

a first device having a MEMS motion sensor, an encoding unit, a transceiver, a connection establishment unit, a processor, and a non-transitory memory for storing computer readable instructions when executed by the processor enables the device to:

capture, via the MEMS motion sensor, its motion information when the device is manipulated by a user in three-dimensional space along a trajectory;

encode, via the encoding unit, the locally captured motion information into a corresponding second motion signature;

receive, via the transceiver, from a second device a second motion signature corresponding to the first device's motion along the trajectory;

send, via the transceiver, to the server said first and second motion signatures;

receive, via the transceiver, from the server the result of the signature match;

and establish a connection, via the connection establishment unit, with the second device when a match between the two signatures is determined;

the second device having a camera, an encoding unit, a transceiver, a connection establishment unit, a processor, and a non-transitory memory for storing computer readable instructions when executed by the processor enables the device to:

remotely capture, via the camera, motion information of the first device manipulated by the user in three-dimensional space along a trajectory;

encode, via the encoding unit, the remotely captured motion information into a corresponding second motion signature;

send, via the transceiver, to the first device the second motion signature; and establish a connection, via the connection establishment unit, with the first device when a match between the first motion signature and said second motion signature is determined.

6. A system for connecting a plurality of devices, comprising:

a server having a transceiver, a processor, and a non-transitory memory for storing computer readable instructions when executed by the processor enables the device to:

receive, via the transceiver, a first motion signature from a first device and a second motion signature from a second device;

compare the two motion signatures to determine if they match; and send, via the transceiver, the match result and, in case of a match, a unique identifier corresponding to the match, to both devices;

a first device having a camera, an encoding unit, a transceiver, a connection establishment unit, a processor, and a non-transitory memory for storing computer readable instructions when executed by the processor enables the device to:

remotely capture, via the camera, motion information of the second device manipulated by a user in three-dimensional space along a trajectory; encode, via the encoding unit, the remotely captured motion information into a corresponding first motion signature;

send, via the transceiver, to the server said first motion signature;

receive, via the transceiver, from the server the result of its signature match, along with a unique identifier corresponding to the match in case a match of the two signature is determined;

and establish a connection, via the connection establishment unit, with the second device based on the unique identifier when a match between the two motion signatures is determined;

the second device having a MEMS motion sensor, an encoding unit, a transceiver, a connection establishment unit, a processor, and a non-transitory memory for storing computer readable instructions when executed by the processor enables the device to:

capture, via the MEMS motion sensor, its motion information when the device is manipulated by the user in three-dimensional space along a trajectory; encode, via the encoding unit, the locally captured motion information into a corresponding second motion signature;

send, via the transceiver, to the server said second motion signature;

receive, via the transceiver, from the server the result of its signature match, along with a unique identifier corresponding to the match in case a match of the two signature is determined; and establish a connection, via the connection establishment unit, with the first device based on the unique identifier when a match between the two motion signatures is determined.

7. A system for connecting a plurality of devices, comprising:

a server having a transceiver, a processor, and a non-transitory memory for storing computer readable instructions when executed by the processor enables the device to:

receive, via the transceiver, a plurality of signatures generated based on device motion from a plurality of devices;

group the motion signatures based on information that include at least one of: (a) the times related to the device motion and (b) the locations related to the device motion, to determine the corresponding devices for connection establishment with one another; and broadcast the grouped motion signatures to the corresponding devices;

one or more devices having a camera, an encoding unit, a transceiver, a connection establishment unit, a processor, and a non-transitory memory for storing computer readable instructions when executed by the processor enables the device to:

remotely capture, via the camera, motion information of another device manipulated by a user in three-dimensional space along a trajectory;

encode, via the encoding unit, the remotely captured motion information into a corresponding motion signature;

send, via the transceiver, to the server said motion signature;

receive, via the transceiver, from the server motion signature(s) corresponding to device(s) with which to establish connection(s);

match, via the connection establishment unit, the received motion signature(s) with the signature generated from remotely captured motion information; and establish respective connection(s), via the connection establishment unit, with device(s) corresponding to received motion signature(s) when a match between the signature generated from remotely captured motion information and a received motion signature is determined;

one or more device(s) having a MEMS motion sensor, an encoding unit, a transceiver, a connection establishment unit, a processor, and a non-transitory memory for storing computer readable instructions when executed by the processor enables the device to:

capture, via the MEMS motion sensor, its motion information when the device is manipulated by a user in three-dimensional space along a trajectory;

encode, via the encoding unit, the locally captured motion information into a corresponding motion signature;

send, via the transceiver, to the server said motion signature;

receive, via the transceiver, from the server motion signature(s) corresponding to device(s) with which to establish connection(s);

match, via the connection establishment unit, the received motion signature(s) with the signature generated from locally captured motion information; and establish respective connection(s), via the connection establishment unit, with device(s) corresponding to received motion signature(s) when a match between the signature generated from locally captured motion information and a received motion signature is determined.

8. The system of claim 7, wherein device connection is established via the server, such that data exchanged between the two devices over such a connection pass through the server.

9. The system of claim 8, wherein said encoding of captured motion information comprise encoding the motion's trajectory shape and contour.

10. The system of claim 9, wherein said encoding of trajectory shape and contour further incorporates time sequence of various points in the motion trajectory, utilizing encoding methods that include at least one of: (a) Fourier shape descriptor method, (b) geometric parameter method, (c) shape invariant moment method, (d) rotation function method, and (e) wavelet descriptor method.

11. The system of claim 8, wherein said encoding of captured motion information comprise encoding the motion's prominent features, including at least one of: speed, acceleration and direct trend parameters along the trajectory.

12. The system of claim 11, wherein encoding the motion parameters utilize a differential encoding method to eliminate the encoding influence caused by different types of motion detection in various devices.

13. The system of claim 7, wherein a device converts the motion signature generated from its captured information from one encoding to another prior to sending the motion signature to the server.

14. The system of claim 7, wherein a device converts the motion signature generated from its captured information from one encoding to another prior to sending the motion signature to the server.

15. A system for connecting a plurality of devices, comprising: a first device having a camera, an encoding unit, a transceiver, a connection establishment unit, a processor, and a non-transitory memory for storing computer readable instructions when executed by the processor enables the device to: remotely capture, via the camera, motion information of another device manipulated by a user in three-dimensional space along a trajectory; encode, via the encoding unit, the remotely captured motion information into a corresponding first motion signature; receive, via the transceiver, from a plurality of other devices motion signatures corresponding to said devices' motion information; match, via the connection establishment unit, the plurality of received motion signatures individually with the motion signature generated from remotely captured motion information, wherein the match is further determined based on auxiliary information comprising at least one of: (a) time information related to the motion, (b) position/location information related to the motion, (c) device information, and (d) connection information related to the other device in case said device has previously established a connection with the first device; and establish a connection, via the connection establishment unit, with the other device when a match between the two signatures is determined;

a second device comprising one of the plurality of devices, the device having a M EMS motion sensor, an encoding unit, a transceiver, a connection establishment unit, a processor, and a non-transitory memory for storing computer readable instructions when executed by the processor enables the device to: capture, via the MEMS motion sensor, its motion information when the device is manipulated by a user in three-dimensional space along a trajectory; encode, via the encoding unit, the locally captured motion information into a corresponding second motion signature; send, via the transceiver, to the first device said second motion signature; and establish a connection, via the connection establishment unit, with the first device when a match between the first motion signature and said second motion signature is determined.

16. The system of claim 15, wherein the first device has connections established individually with a second and third device each having a MEMS motion sensor, an encoding unit, a transceiver, a connection establishment unit, a processor, and a non-transitory memory for storing computer readable, the first device is further enabled to establish, via its connection establishment unit, a connection between the second and the third device such that data exchanged between the second and the third device over such a connection pass through the first device.

17. The system of claim 16, wherein the first device has connections established individually with a second and third device each having a MEMS motion sensor, an encoding unit, a transceiver, a connection establishment unit, a processor, and a non-transitory memory for storing computer readable, the first device is further enabled to establish, via its connection establishment unit, a direct connection between the second and third device by broadcasting identification information related to the second and third device.

18. The system of claim 15, wherein a device is triggered to initiate a connection establishment with another device when at least one of the following conditions is satisfied:

(a) a user clicking a button of the device;

(b) the device entering a predetermined mode;

(c) a predetermined object or motion coming into view of the camera, said object include at least one of: (i) a user's hand, (ii) a user's face and (iii) a user's gesture;

(d) a light emitting unit of the device outputting light in a predetermined mode, said mode include at least one of outputting light in a specific (i) color, (ii) brightness, (iii) shape, (iv) size, and (v) flashing frequency; and (e) the device being manipulated in a predetermined motion pattern.

19. The system of claim 15, wherein a device is triggered to disconnect an existing connection established with another device when at least one of the following conditions is satisfied:

(a) elapse of a predetermined amount of time during which no operation was performed by the connected devices over the connection;

(b) determination that a user has left the vicinity of a device;

(c) detection via camera or MEMS sensor a user gesture used that was used to initiate connection establishment;

(d) receiving a disconnect signal from a server; and (e) detection via short-range communication technology in one of devices that the other device is no longer within range of communication.

20. The system of claim 15, wherein devices having a connection established with one another run application(s) that exchange data over the connection, said data comprising network configuration information allowing the connected devices to subsequently access the same network.

* * * * *